HYDRAULIC ELEVATOR CONTROL SYSTEMS

Original Filed April 10, 1967 2 Sheets-Sheet 1

INVENTOR
Everett E. Johnston
BY
Wofford & Felsman
ATTORNEYS

HYDRAULIC ELEVATOR CONTROL SYSTEMS

Original Filed April 10, 1967 2 Sheets-Sheet 2

INVENTOR.
Everett E. Johnston
BY Wofford & Felsman
ATTORNEYS

United States Patent Office

Re. 27,233
Reissued Nov. 9, 1971

27,233

HYDRAULIC ELEVATOR CONTROL SYSTEMS

Everett E. Johnston, Newark, Tex., assignor to
Esco Elevators, Inc., Fort Worth, Tex.

Original No. 3,438,398, dated Apr. 15, 1969, Ser. No. 629,520, Apr. 10, 1967. Application for reissue Apr. 13, 1970, Ser. No. 28,158
Int. Cl. B66b *1/24, 5/04*
U.S. Cl. 137—608 2 Claims

Matter enclosed in heavy brackets [ ] appears in the original patent but forms no part of this reissue specification; matter printed in italics indicates the additions made by reissue.

ABSTRACT OF THE DISCLOSURE

Hydraulic elevator control system maintains down-speed essentially constant for all elevator loads. Device positively responsive to fluid flow through down-control valve controls a metering valve to regulate fluid flow in a down-control valve bleed line to regulate the degree of opening of the down-control valve main flow aperture.

Background of the invention

For many years it was common to permit a large variation in hydraulic elevator no-load to full-load down-speed. More recently, increased hydraulic elevator speeds have made it highly desirable to maintain down-speed as nearly constant as possible for all loads. Hydraulic elevator down-speed control in accordance with the present invention achieves improved accuracy as to the ideal of constant down-speed for all loads, accompanied by improved simplicity and economy.

Description of Preferred embodiments

Figure 5:
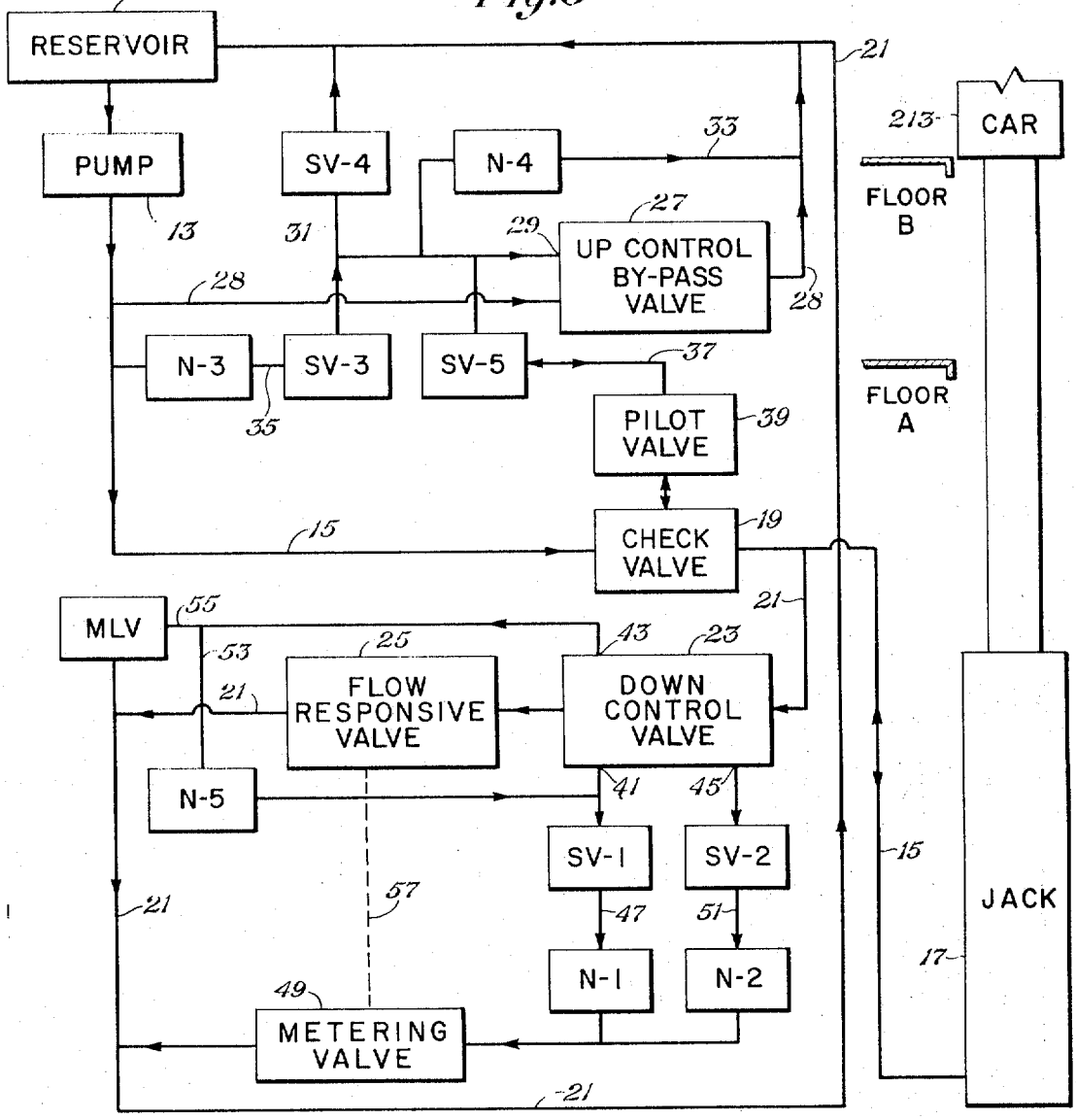
FIG. 5 is a schematic diagram of the fluid system of a hydraulic elevator in accordance with a preferred embodiment of the invention.

Referring now to the drawings and initially to FIG. 5 for an overall description of the apparatus, the numeral 11 designates a fluid reservoir which is preferably located in an elevated position with respect to a fluid pump 13, normally operated by an electric motor (not shown). A primary conduit 15 connects the pump 13 with a hydraulic jack 17. A check valve 19 is interposed in the primary conduit 15. A return conduit 21 communicates with the primary conduit 15 on the down stream side of the check valve 19, and via a down control valve 23 and a flow responsive valve 25 back to the reservoir 11. An up control by-pass conduit 28 communicates with the primary conduit 15 on the up stream side of the check valve, 19 and via an up control by-pass valve 27 to the return line 21 on the down stream side of the flow responsive valve 25. The up control by-pass valve 27 has a control port 29. A dump line 31 communicates between the control port 29 and the return conduit 21. A solenoid valve designated SV–4 is interposed in the dump line 31. A slow down line 33 communicates between the control port 29 and the return conduit 21. A slow down orfice or needle valve N–4 is interposed in the slow down line 33. An up acceleration line 35 communicates between the primary conduit 15 on the up stream side of the check valve 19 and the control port 29. A needle valve N–3 and a solenoid valve SV–3 are interposed in the up acceleration line 35. An up leveling line 37 communicates between the control port 29 and the primary conduit 15 via check valve 19. A solenoid valve SV–5 and a pilot valve 39 are interposed in the up leveling line 37.

The down control valve 23 has a down speed port 41, a down deceleration port 43 and a down leveling port 45. A down speed line 47 comunicates between the down speed port 41 and the return conduit 21. A solenoid valve SV–1, a needle valve N–1 and a metering valve 49 are interposed in the down speed line 47. A down leveling line 51 communicates between the down leveling port 45 and the return conduit 21. A solenoid valve SV–2, a needle valve N–2 and the metering valve 49 are interposed in the down leveling line 51. A down deceleration line 53 communicates between the down deceleration port 43 and the down speed port 41. A needle valve N–5 is interposed in the down deceleration line 53. A manual lowering line 55 communicates between the down deceleration port 43 and the return conduit 21. A manual lowering valve MLV is interposed in the manual lowering line 55. The metering valve 49 is mechanically related to the flow responsive valve 25 as indicated by the dotted line 57.

Although a complete hydraulic elevator control system has been shown in FIG. 5, the present invention is concerned only with the down-control portion of the system. Accordingly, details of the up-control portion of the system are not described or shown herein. Actually, various up-control systems could be used in hydraulic elevator control systems embodying the present invention. For further details of the up-control portion of the control system of FIG. 5, reference is made to U.S. Patent No. 3,266,382.

Figure 3:
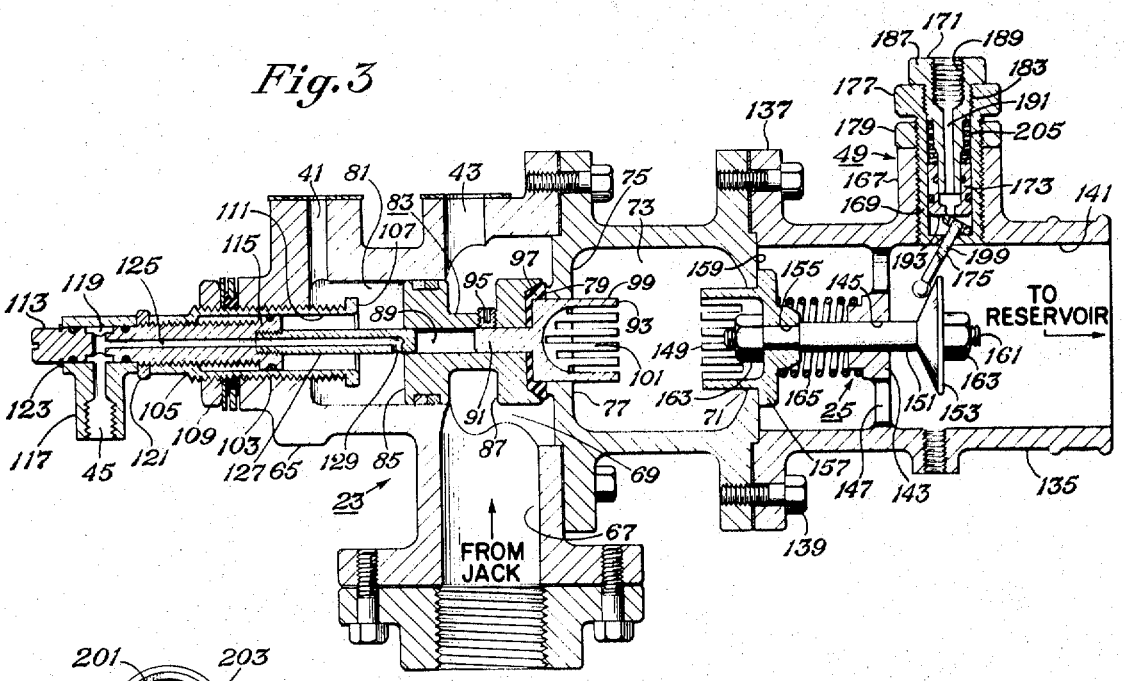
FIG. 3 is a longitudinal vertical sectional view taken along lines III—III of FIG. 2, but with solenoid valves and associated manifold assembly removed.
Figure 4:
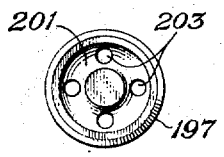
FIG. 4 is an enlarged plan view of the metering valve metering head.
Figure 2:
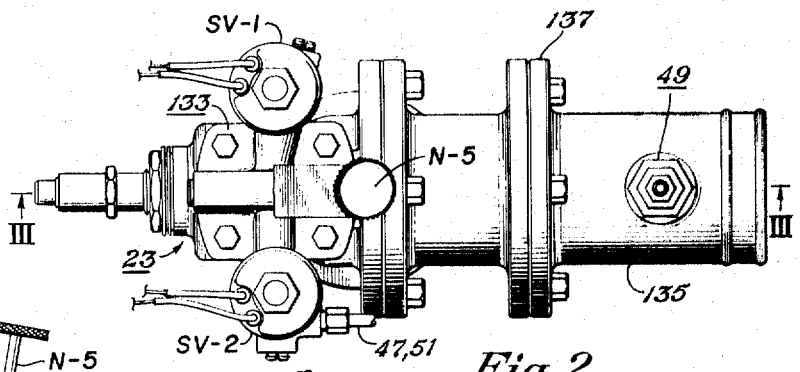
FIG. 2 is a top plan view of the apparatus of FIG. 1.
Figure 1:
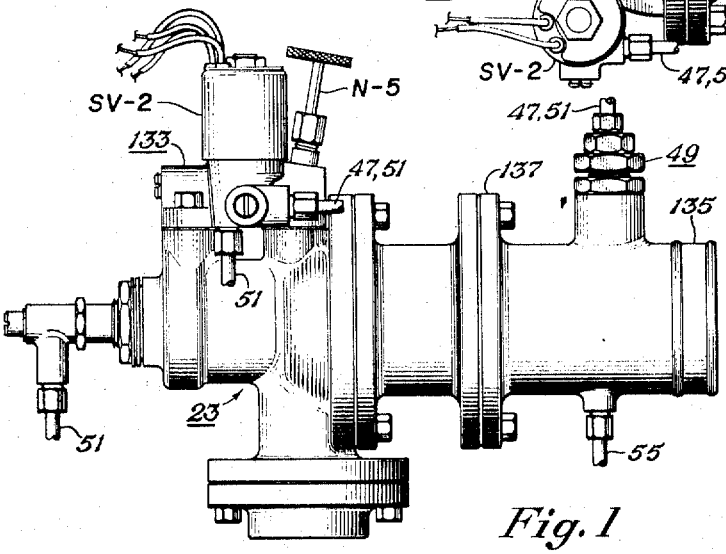
FIG. 1 is a schematic side elevational view of a down-control valve, flow responsive valve, and metering valve that may be used in a hydraulic elevator control system in accordance with a preferred embodiment of the invention.
Figure 7:
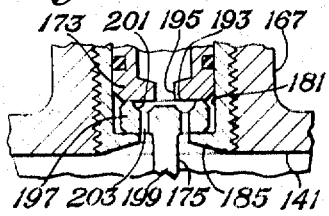
FIG. 7 is an enlarged fragmentary vertical section view showing portions of the metering valve.

Referring now particularly to FIGS. 1, 2 and 3 of the drawings, there is shown a down-control valve 23, a flow responsive valve 25 and a metering valve 49 typical of those which may be utilized in the practice of the present invention. The down-control valve 23 includes a valve body 65 having an inlet passage 67 leading to an inlet cavity 69, and an outlet cavity 73. Interposed between the inlet and outlet cavities 69, 73 is a wall structure 75 having an opening therein which is the main valve aperture 77. Circumferentially disposed about the main valve aperture on the inlet side is a main valve seat 79. The valve body 65 also has a cylindrical control cavity 81 disposed coaxially with the main valve aperture 77 and opening on the side of the inlet cavity 69 opposite the main valve aperture 77.

One end portion of a spool member 83 forms a piston 5 which works in said cylindrical control cavity 81, nd the other end portion forms a valve disc 87. The pool member 83 has a central bore 89 which at one nd portion receives the cylindrical stem 19 of a spool uide 93. The spool guide 93 is secured to the spool nember 83 by means of a set screw 95 which engages s stem 91. A gasket 97 is sandwiched between the end ace of the valve disc 87 and the closed end of the spool uide 93, and has an exposed annular face which engages he main valve seat 79 when the main valve aperture 77 s closed. The spool guide 93 has a cylindrical portion 9 which makes a sliding fit with the main valve aperure 77 so as to provide guide support for the valve isc end of the spool member 83. The spool guide 93 as a reentrant cup-shaped cavity 101 co-axial with the tem portion and opening on the outlet cavity 73. The vall of the spool guide cylindrical portion 99 is slotted o provide fluid flow apertures communicating between he inlet and outlet cavities and of size depending on the xial position of the spool member 83.

The valve body 65 has a threaded bore 103 disposed o-axially with the cylindrical cavity 81 and leading from he outer end of same to the valve body exterior. A arrel member 105 has a threaded exterior portion ngaging the valve body threaded bore. The inner end f the barrel member terminates in a flange 107 which erves as a stop to limit the outward travel of the piston 5. A lock nut 109 engages the barrel threaded exterior o fix the flange stop 107 at a selected position. The arrel member 105 has a cylindrical bore 111 extending rom the flange stop end and merging with a smaller hreaded bore. A stem member 113 has exterior threads which engage those of said smaller threaded bore and nerge at one end with a guide piston 115 which engages aid barrel member cylindrical bore 111. The stem memer 113 has a cylindrical outer end portion with a circumferential groove disposed intermediate its ends. A ' fitting 117 has a barrel portion which makes a sliding it on said stem member 113, and with said groove, orms an annulus 119 which communicates with a pasage to the down-leveling port 45. Suitable seals are rovided on both sides of the annulus between the T itting barrel portion and the stem member. A lock nut 21 engages the stem member threaded portion and ecures the stem member 113 at the selected axial posion. A keeper ring 123 retains the T fitting barrel porion on the stem member 113. The stem member 113 has n axial bore 125 communicating at one end, via radial penings with the annulus 119 and at the other end vith a threaded bore which receives the threaded end of cylindrical extension member 127. The extension memer 127 has an axial bore which mates with and proides an extension of the stem member bore 125. The nd of the extension member 127 opposite the threaded nd is received by the central bore 89 of the spool nember 83, and the extension member bore terminates ear this end where it communicates with a radial orifice pening, which for convenience will be herein referred o as the down leveling orifice 129.

The valve body 65 has a passage leading from the lown speed port 41 to the cylindrical control cavity 81 t the outer end portion thereof. The valve body 65 lso has a passage leading from the down deceleration ort 43 to the inlet cavity 69. The down control valve as a manifold assembly 133 which mounts the solenoid valves SV–1 and SV–2 and needle valve N–5. The manifold assembly 133 has suitable internal passages to provide communication to effect the connections shown by FIG. 5.

The flow responsive valve 25 and the metering valve 49 are carried by a support body 135 of generally cylindrical shape and having a flanged end 137 secured by bolts 139 to the down control valve body 65. The support body 135 has a central bore 141 coaxial with an outlet aperture 71 of the outlet cavity 73. Disposed within said support body central bore is a web structure 143 having a central bore 145 coaxial with the outlet aperture 71. The web structure 143 has axially extending openings 147 to permit free fluid flow. The flow responsive valve 25 includes a head portion 149, a guide sleeve 151 and a control cone 153. The head portion is generally cup-shaped, with the cup sidewall exterior being cylindrical and making a sliding fit with said outlet aperture 71. The cup bottom has an axial bore 155 and also an outwardly extending circumferential flange 157 having an annular side face that can seat on the annular exterior surface of the outlet cavity end wall 159 adjacent the outlet aperture 71. The guide sleeve 151 makes a sliding fit with the web structure central bore 145. The guide sleeve 151 is disposed between the bottom of the head portion 149 and the control cone 153. A bolt rod 161 passes through and slidably engages the bores of the head portion 149, guide sleeve 151, and control cone 153. Nuts 163 engage threaded ends of the bolt rod 161 to clamp the head portion, sleeve, and control cone together. A compression spring 165 surrounds the guide sleeve 151 and urges the head portion 149 toward the closed position. The head portion sidewall is slotted to provide fluid flow apertures communicating between the outlet cavity 73 and the support body central bore 141 and of size depending on the axial position of the flow responsive valve 25.

On the support body 135 near the downstream side of the web structure 143 is a boss 167 having a threaded bore the central axis of which intersects the central axis of the support body. The metering valve 49 includes a barrel portion 169, a stem portion 171, a plunger 173, and a metering member 175. The barrel portion outer end is in the form of a bolt head 177. The barrel exterior from the bolt head to the inner end is threaded to mate with the boss threaded bore. A lock nut 179 threadedly engages the barrel portion to fix the barrel portion in the selected axial position. The barrel portion 169 has a cylindrical bore 181 which extends from an internally threaded bore 183 at the barrel outer end to an inwardly extending flange 185 at the barrel inner end. The stem portion 171 has a bolt head 187, external threads adjacent the bolt head and engaging the internally threaded bore 183 of the barrel portion 169, an intermediate cylindrical portion of reduced diameter adjacent the external threads, and a lower cylindrical portion of further reduced diameter adjacent the intermediate cylindrical portion. The stem portion 171 also has an internally threaded bore 189 opening to a central bore 191. The plunger 173 is cup-shaped, having an exterior cylindrical surface that makes a sliding fit with the barrel portion cylindrical bore 181, and having an interior cylindrical surface that makes a sliding fit with the lower cylindrical portion of the stem 171. The cup bottom 193 has an axial opening 195. The metering member 175 has a head 197 and a positioner arm 199. The head is generally disc-shaped and is disposed within the barrel cylindrical bore 181 between the plunger 173 and the inwardly extending flange 185. The positioner arm 199 is integral with and depending from the head 197, and has its lower end positioned to coact with the control cone 153 of the flow responsive valve 25. The head upper surface includes an annular groove 201. A plurality of orifice passages 203 extend from the bottom of the groove 201 through the head 197. A compression spring 205 encircles the intermediate cylindrical portion of the stem 171 and urges the plunger 173 downwardly into contact with the head 197.

Figure 6:
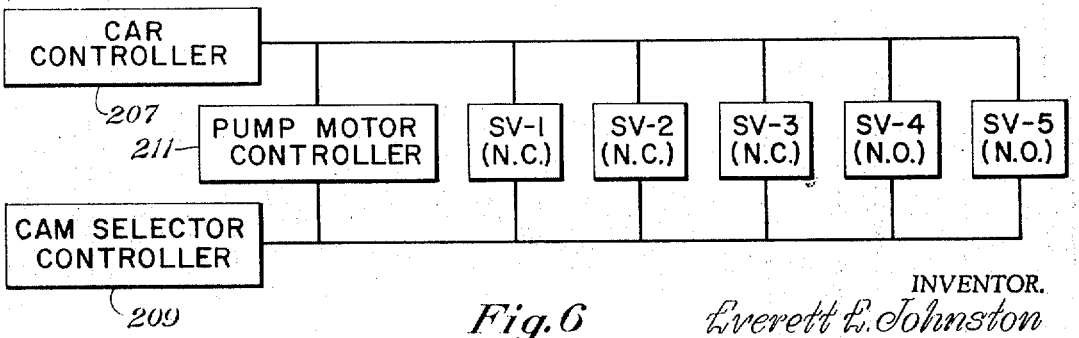
FIG. 6 is a schematic diagram of electrical controls which pertain to the system of FIG. 5.

The electrical controls illustrated by the schematic diagram of FIG. 6 include a car controller 207, a cam selector controller 209, a pump motor controller 211, and solenoid valves SV–1 through SV–5. The pertinent function of these controls will become apparent from the subsequent description of operation of the down-control portion of the hydraulic elevator control system of FIG. 5.

Assume that the elevator car 213 is at rest at floor B. The car and its load are supported by the hydraulic fluid in the jack 17, in the primary conduit 15 between the jack and the check valve 19 which is closed, and in the return conduit 21 between the primary conduit and the down-control valve 23 which is closed. Solenoid valve SV–1 and SV–2 are also closed.

To start downward, the down button (on car controller 207) is depressed, causing solenoid valve SV–1 to open. This permits fluid flow from the control cavity 81 via down speed port 41, SV–1, down speed line 47, needle valve N–1, metering valve 49, and return line 21, to the reservoir 11. Pressure force differential on the piston 85 will now move the piston 85 (and consequently the valve disc 87) toward the stop flange 107 thus opening the down control valve 23, permitting fluid flow from the inlet cavity 69 via the main valve aperture 77 to the outlet cavity 73. This, of course, permits fluid flow from the jack 17 via the down-control valve 23 and the flow responsive valve 25 to the reservoir 11. As soon as fluid starts flowing from the jack, the elevator car 213 bings to descend. The rate of acceleration of the car to full down speed is determined by the setting of the needle valve N–1.

The piston 85 will stop and remain at a position corresponding to the elevator car fulldown speed and a given load, as will hereinafter be explained. While the elevator car 213 is descending at full down speed, the down levelling orifice 129 is covered by the spool member central bore 89. When the car 213 has reached a certain position between floors A and B, a cam on the cam selector controller 209 actuates a switch which energizes solenoid valve SV–2, which then opens. Then another cam on the cam selector controller 209 actuates a switch which de-energizes solenoid valve SV–1, which then closes. Since closing of SV–1 stops the bleeding of fluid from the control cavity 81, a pressure build up on control cavity side of the piston 85 will cause it to move toward the main valve aperture closing position at a rate determined by the setting of the down deceleration needle valve N–5. When the piston 85 has moved sufficiently to uncover the down levelling orifice 129, fluid will bleed via the down levelling port 45 and down levelling line 51 and metering valve 49 to the reservoir 11, at a rate sufficient to stop the closing movement of the piston 85. The regulating action of the down levelling orifice 129 will maintain the piston 85 at the levelling speed position. The down levelling speed is predetedmined by adjustment of the stem member 113 to place the orifice 129 at a selected axial position.

At the moment the elevator car reaches floor A, another cam on the cam selector controller 209 actuates a switch which de-energizes solenoid valve SV–2, which then closes. The closing of SV–2 produces an immediate buildup of pressure on the control cavity side of the piston 85 and the down control valve 23 closes to stop the car 213.

As hereinbefore stated, the present invention is directed to a hydraulic elevator down control system wherein the elevator car full down-speed is maintained as nearly constant as possible, regardless of load. The operation as to the down-speed control will now be explained.

In order for the elevator car 213 to descend at a selected constant down-speed, the rate of fluid flow from the jack 17 via the down-speed, the rate of fluid flow aperture 77 to the reservoir 11 must be constant. For a given elevator load there is a position of the spool member piston 85 that will provide the proper opening at the main valve aperture 77 to permit the flow rate that is required for the selected down-speed. When the elevator load is changed, the flow rate for a given position of the piston 85 (and consequently a given opening at the main valve aperture 77) changes because the fluid pressure on the jack side of the main valve aperture 77 changes. Therefore, when the elevator load changes, the position of the piston 85 must change (to change the opening at the main valve aperture 77) if the flow rate is to be maintained constant. The down-speed control operates to move the piston 85 to the position required to produce the selected flow rate (and consequently the selected down-speed) at the elevator load (pressure within the inlet cavity 69) that at that moment exists, and to maintain the piston 85 in that position.

Fluid pressure in the outlet cavity 73 upon opening of the down control valve 23 will cause the flow responsive device 25 to move in the downstream direction. The fluid flow through the outlet operture 71 will produce a pressure differential on the head portion 149 of the ffow responsive device 25 which will urge the head portion in the downstream direction against the force of the compression spring 165. The axial position of the flow responsive valve, and consequently the position of the cone 153 and positioner arm 199, is determined by the pressure differential on the head portion 149, which in turn is determined by the rate of fluid flow through the outlet aperture 71. The position of the arm 199 determines the position of the head 197 which determines the degree of opening of the metering valve 49.

Assume that there is no load on the elevator car 213 and that it is accelerating toward full down-speed. Fluid will be flowing into the control cavity 81 from the inlet cavity 69 via ports 43 and 41 and line 53, and at the same time fluid will be bleeding away from the control cavity via line 47 and the metering valve 49. The metering valve 49 will be closing since the flow rate at the outlet aperture 71 will be increasing as the down control valve 23 opens. As the metering valve 49 closes, the pressure force differential on the piston 85 decreases, and when the metering valve 49 has closed to the position where the pressure force differential on the piston 85 is zero, the piston stops moving. The position of the control cone 153 relative to the positioner arm 199 has been pre-set such that the piston 85 stops at the position corresponding to that opening of the down control valve 23 at the main valve aperture 77 which will permit that flow rate required to establish the selected down-speed at the no load condition.

Assume now that there is full load on the elevator car 213 and that it is accelerating toward full down-speed. The action under this condition is similar to that described above with reference to the no load condition. However, due to the greater load, the pressure in the inlet cavity 69 will be greater; the initial differential pressure force on the piston 85 will be greater; the flow rate through the metering valve 49 will be greater; and the closing rate of the metering valve will be greater. The consequence of these new parameters is that the differential pressure force on the piston 85 will reach zero before the piston has travelled as far as in the no load case, with the piston stopping at the position corresponding to the opening of the down control valve 23 at the main valve aperture 77 which will permit that flow rate required to establish the selected down-speed. The selected down-speed is of course the same for the no load and the full load conditions. Also, the flow rate past the main valve aperture 77 is the same for the no load and full load conditions. The difference is that the opening at the main valve aperture 77 is smaller for the full load condition than for the no load condition. The pressure drop across the outlet aperture 71, and consequently the degree of opening of the metering valve 49, is the same for the full load and no load conditions.

For any load between no load and full load, the action is similar to that just described for the no load and full load conditions. However, for each load condition the differential pressure force on the piston 85 will reach zero when the piston 85 is in a position corresponding to the opening at the main valve aperture 77 which will permit that flow rate required to establish the selected down-speed.

Any increase or decrease in pressure in the inlet cavity 9 will cause the piston 85 to immediately assume a new balance position corresponding to the opening at the main valve aperture 77 which will permit that flow rate required to establish the selected down-speed. The term "elevator load" as used herein, in addition to the actual load carried by the elevator, includes any factor that will cause an increase or decrease in pressure in the inlet cavity. For example, an elevator jack of the plunger type will exhibit a floating effect which varies with the distance of the plunger from the bottom of the jack cylinder, and this will affect the inlet cavity pressure and will consequently vary the "elevator load" as the elevator descends. Also for example, an elevator jack of the plunger type will exhibit variations in friction between the plunger and its hydraulic seals over the plunger length, and this will affect the inlet cavity pressure and will consequently vary the elevator load. The response of the down-speed control system of the instant invention to variations in pressure in the inlet cavity is such that there is no noticeable variation in the elevator car down-speed.

Briefly stated, the present invention contemplates a hydraulic elevator down-control system of the type wherein a primary conduit connects a fluid reservoir via a pump and a check valve to a jack, and a return conduit is connected to the primary conduit on the jack side of the check valve and communicates via a down control valve with the reservoir. The down control valve would have a main valve aperture interposed between an inlet cavity and an outlet cavity and closure means for determining the opening at the main valve aperture. There would be provided means defining a control cavity, a piston reciprocable within the control cavity, with the piston having a first side and a second side. There would be provided means coupling the piston with the main valve aperture closure means so that the position of the closure means and consequently the opening at the main valve aperture would be determined by the position of the piston. There would be provided means permitting fluid from the inlet cavity to exert pressure on both sides of the piston and means providing a greater area exposed to fluid pressure on the first side of the piston than on the second side. A flow responsive device would be interposed in the return conduit at a region intermediate the down-control valve and the reservoir, with the flow responsive device having a movable element the position of which is directly controlled by the flow rate of fluid passing through the device. There would be provided conduit means communicating between the control cavity on the piston first side and the return line, with a metering valve interposed in the conduit means and coupled to the flow responsive device movable element so that movement of the movable element to permit greater flow rate of fluid passing through the flow responsive device will move the metering valve toward the closed position and movement of the movable element to permit lesser flow rate of fluid passing through the flow responsive device will move the metering valve toward the opened position.

The term "jack" as used herein encompasses any power cylinder means wherein the position of a piston or plunger within a cylinder is controlled by hydraulic fluid and power is transmitted from the power cylinder means to an elevator car.

While I have shown my invention in only one form, it will be obvious to those skilled in the art that it is not so limited, but is susceptible of various changes and modifications without departing from the spirit thereof.

I claim:

1. In a hydraulic elevator down-control system of the type having a primary conduit that connects a fluid reservoir via a pump and a check valve to a jack, a return conduit connected to said primary conduit on the jack side of said check valve and communicating via a down control valve with said reservoir, with said down control valve having a main valve aperture interposed between an inlet cavity and an outlet cavity and closure means for determining the opening at said aperture, the improvement comprising:

(a) means defining a control cavity;

(b) a piston reciprocable within said control cavity and having a first side and a second side;

(c) means coupling s aid piston with said closure means so that the position of said closure means and consequently the opening at said aperture is determined by the position of said piston;

(d) means permitting fluid from said inlet cavity to exert pressure on both sides of said piston;

(e) means providing a greater area on the first side of said piston exposed to fluid pressure than on the second side of said piston;

(f) a flow responsive device interposed in said return conduit at a region intermediate said down control valve and said reservoir, said flow responsive device having a movable element the position of which is directly controlled by the flow rate of fluid passing through said device;

(g) conduit means communicating between said control cavity on said piston first side and said return line; and (h) a metering valve interposed in said conduit means and coupled to said flow responsive device movable element so that movement of said movable element to permit greater flow rate of fluid passing through said device will move said metering valve toward the closed position and movement of said movable element to permit lesser flow rate of fluid passing through said device will move said metering valve toward the opened position.

*2. In a hydraulic elevator down-control system of the type having a primary conduit that connects a fluid reservoir via a pump and check valve to a jack, a return conduit connected to said primary conduit on the jack side of said check valve and communicating via a down control valve with said reservoir, with said down control valve having a main valve aperture interposed between an inlet cavity and an outlet cavity and closure means for determining the opening at said aperture, the improvement comprising:*

*(a) means defining a control cavity;*

*(b) a piston reciprocable within said control cavity and having a first side and a second side;*

*(c) means coupling said piston with said closure means so that the position of said closure means and consequently the opening at said aperture is determined by the position of said piston;*

*(d) means permitting fluid from side inlet cavity to exert pressure on both sides of said piston;*

*(e) means providing a greater area on the first side of said piston exposed to fluid pressure than on the second side of said piston;*

*(f) a flow responsive device interposed in said return conduit at a region intermediate said down control valve and said reservoir, said flow responsive device having a movable element the position of which is directly controlled by the flow rate of fluid passing through said device;*

*(g) conduit means communicating between said control cavity on said piston first side and said return line; and*

*(h) a metering orifice interposed in said conduit means and cooperative with said flow responsive device movable element so that movement of said movable element to permit lesser flow rate of fluid passing through said device will adjust said orifice toward the closed position and movement of said movable element to permit greater flow rate of fluid passing*

*through said device will adjust said orifice toward the opened position.*

References Cited

The following references, cited by the Examiner, are of record in the patented file of this patent or the original patent.

UNITED STATES PATENTS

| | | | |
|---|---|---|---|
| 2,600,702 | 6/1952 | Stephens | 137—608 |
| 2,911,006 | 11/1959 | Vogel | 137—608 X |

| | | | |
|---|---|---|---|
| 3,037,354 | 6/1962 | Tennis | 137—612.1 X |
| 3,125,319 | 3/1964 | Arbogast et al. | 91—461 X |
| 3,162,096 | 12/1964 | Lahde | 91—461 X |
| 3,213,762 | 10/1965 | Dubuf | 137—612.1 X |

SAMUEL SCOTT, Primary Examiner

U.S. Cl. X.R.

91—461